US012663508B2

(12) United States Patent
Akamine et al.

(10) Patent No.: US 12,663,508 B2
(45) Date of Patent: Jun. 23, 2026

(54) SIGNAL PROCESSING APPARATUS

(71) Applicant: DENSO CORPORATION, Kariya-city (JP)

(72) Inventors: Yusuke Akamine, Nisshin-city (JP); Takuya Takayama, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 431 days.

(21) Appl. No.: 18/319,326

(22) Filed: May 17, 2023

(65) Prior Publication Data

US 2023/0305105 A1      Sep. 28, 2023

Related U.S. Application Data

(63) Continuation of application No. PCT/JP2021/041916, filed on Nov. 15, 2021.

(30) Foreign Application Priority Data

Nov. 20, 2020      (JP) ................................. 2020-193532

(51) Int. Cl.
  *G01S 7/35*          (2006.01)
  *G01S 13/53*        (2006.01)
        (Continued)

(52) U.S. Cl.
  CPC ............ *G01S 7/354* (2013.01); *G01S 13/536* (2013.01); *G01S 13/56* (2013.01); *G01S 13/931* (2013.01)

(58) Field of Classification Search
  CPC ........ G01S 7/354; G01S 13/536; G01S 13/56; G01S 13/931
  See application file for complete search history.

(56) References Cited

U.S. PATENT DOCUMENTS

2004/0246167 A1      12/2004      Kumon et al.
2011/0050484 A1      3/2011      Nakanishi
                      (Continued)

FOREIGN PATENT DOCUMENTS

JP            2-55184 U1      4/1990
JP      H11-271431 A      10/1999
                      (Continued)

OTHER PUBLICATIONS

WO 2013069253 A1 (Year: 2012).*

*Primary Examiner* — Robert W Hodge
*Assistant Examiner* — Helena H Seraydaryan
(74) *Attorney, Agent, or Firm* — Precision Patents, P.C.

(57)            ABSTRACT

A signal processing apparatus is mounted in a moving body and performs a process for measuring an object present in a vicinity of the moving body. The apparatus sets an intensity threshold corresponding to an intensity distribution based on at least one measurement signal periodically generated, and extracts at least one target peak that is a peak that is greater than the intensity threshold in the intensity distribution, using an upper limit number set in advance as an upper limit. The apparatus stores, in a storage unit, the number of extracted peaks that is the number of the at least one target peak extracted, and sets the intensity threshold so as to suppress the number of the at least one target peak in a new intensity distribution from exceeding the upper limit number, based on the number of extracted peaks in a previous intensity distribution stored in the storage unit.

13 Claims, 7 Drawing Sheets

(51) Int. Cl.
  _G01S 13/536_        (2006.01)
  _G01S 13/56_         (2006.01)
  _G01S 13/931_        (2020.01)

(56)                References Cited

U.S. PATENT DOCUMENTS

| | | | |
|---|---|---|---|
| 2022/0317250 A1* | 10/2022 | Bae | G01S 7/484 |
| 2023/0176223 A1* | 6/2023 | Pacala | G01S 17/42 |
| | | | 356/5.01 |

FOREIGN PATENT DOCUMENTS

| | | | |
|---|---|---|---|
| JP | 3420177 | B2 | 4/2003 |
| JP | 2003-130942 | A | 5/2003 |
| JP | 2012-163400 | A | 8/2012 |
| JP | 2014-174068 | A | 9/2014 |
| JP | 2018-054506 | A | 4/2018 |
| JP | 2019-027979 | A | 2/2019 |

\* cited by examiner

SIGNAL PROCESSING APPARATUS

CROSS-REFERENCE TO RELATED APPLICATION

The present application is a continuation application of International Application No. PCT/JP2021/041916, filed on Nov. 15, 2021, which claims priority to Japanese Patent Application No. 2020-193532, filed on Nov. 20, 2020. The contents of these applications are incorporated herein by reference in their entirety.

BACKGROUND

Technical Field

The present disclosure relates to a signal processing apparatus.

Related Art

A radar signal detection apparatus that sets a threshold for a signal acquired from a radar apparatus using a constant false alarm rate (CFAR) process such that an erroneous detection rate of the signal is fixed is known. In general, when the threshold is set using the CFAR process, a peak that exceeds the threshold is extracted from the signal from the radar apparatus. Based on the extracted peak, an object is recognized.

SUMMARY

One aspect of the present disclosure provides a signal processing apparatus that is mounted in a moving body and performs a process for measuring an object that is present in a vicinity of the moving body using at least one measurement signal based on a reflected wave of a transmission wave that is irradiated. The signal processing apparatus sets an intensity threshold that corresponds to an intensity distribution based on the measurement signal that is periodically generated. The signal processing apparatus extracts at least one target peak that is a peak that is greater than the intensity threshold in the intensity distribution, using an upper limit number that is set in advance as an upper limit. The signal processing apparatus stores, in a storage unit, the number of extracted peaks that is the number of the at least one target peak extracted. The signal processing apparatus sets the intensity threshold so as to suppress the number of the at least one target peak in a new intensity distribution from exceeding the upper limit number, based on the number of extracted peaks in a previous intensity distribution stored in the storage unit.

DESCRIPTION OF THE EMBODIMENTS

JP 3420177 B2 describes a radar signal detection apparatus that sets a threshold for a signal that is acquired from a radar apparatus using a CFAR process such that an erroneous detection rate of the signal is fixed. Here, CFAR is an abbreviation of Constant False Alarm Rate. In general, when the threshold is set using the CFAR process, a peak that exceeds the threshold is extracted from the signal from the radar apparatus and an object is recognized based on the extracted peak.

However, as a result of detailed examination by the inventors, the following issue has been found. That is, when numerous peaks that exceed the threshold are present in the signal from the radar apparatus, processing load for recognizing an object based on the peak increases. However, on the other hand, when an upper limit is provided for the number of peaks that are extracted, a peak that indicates presence of an important object may not be able to be extracted.

It is thus desired to to provide a signal processing apparatus that is capable of suppressing non-extraction of a peak.

An exemplary embodiment of the present disclosure provides a signal processing apparatus that is mounted in a moving body and performs a process for measuring an object that is present in a vicinity of the moving body using at least one measurement signal based on a reflected wave of a transmission wave that is irradiated. The signal processing apparatus includes a setting unit, an extracting unit, and a storage processing unit.

The setting unit is configured to set an intensity threshold that corresponds to an intensity distribution based on the measurement signal that is periodically generated. The extracting unit is configured to extract at least one target peak that is a peak that is greater than the intensity threshold in the intensity distribution, using an upper limit number that is set in advance as an upper limit. The storage processing unit is configured to store the number of extracted peaks that is the number of the at least one target peak extracted by the extracting unit in a storage unit.

The setting unit sets the intensity threshold so as to suppress the number of the at least one target peak in a new intensity distribution from exceeding the upper limit number, based on the number of extracted peaks in a previous intensity distribution stored in the storage unit.

As a result of the above-described configuration, before extraction of the at least one target peak from an overall area of the intensity distribution is performed, the number of the extracted at least one target peak can be suppressed from reaching the upper limit number, and extraction of the at least one target peak can be suppressed from ending in the middle thereof.

Exemplary embodiments of the present disclosure will hereinafter be described with reference to the drawings.

1. First Embodiment

1-1. Configuration

Figure 1:
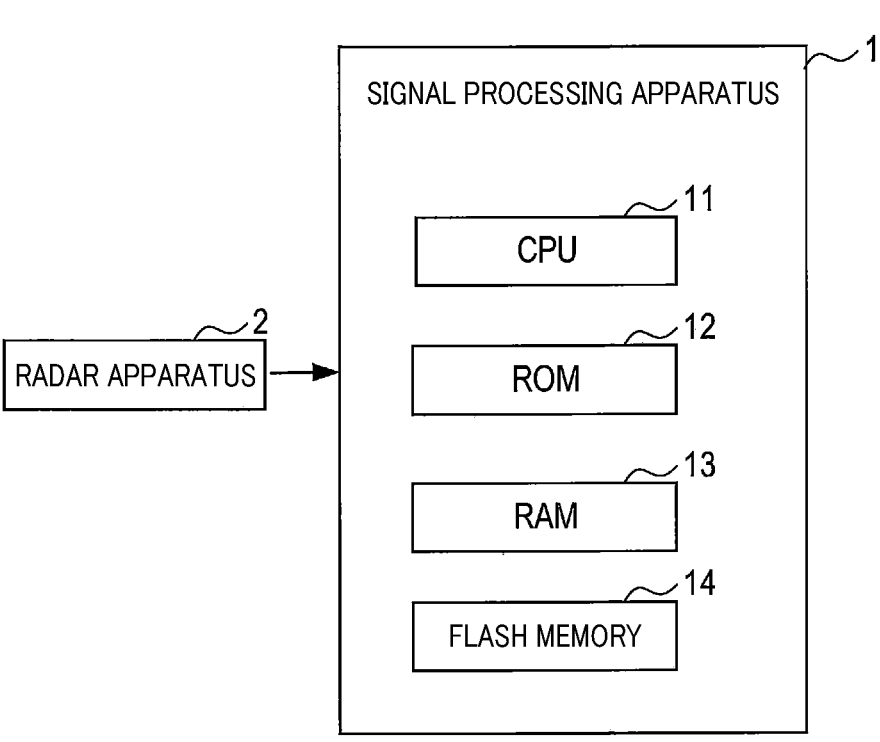
FIG. 1 is a block diagram illustrating a configuration of a signal processing apparatus.

A signal processing apparatus 1 shown in FIG. 1 is mounted in a moving body. The signal processing apparatus 1 is an apparatus that performs a process for measuring an object that is present in a vicinity of the moving body using at least one measurement signal described hereafter. For example, the moving body may be a vehicle, an aircraft, or a ship. In addition to the signal processing apparatus 1, a radar apparatus 2 is mounted in the moving body. According to the present embodiment, the signal processing apparatus 1 and the radar apparatus 2 are mounted in a vehicle 10.

Figure 2:
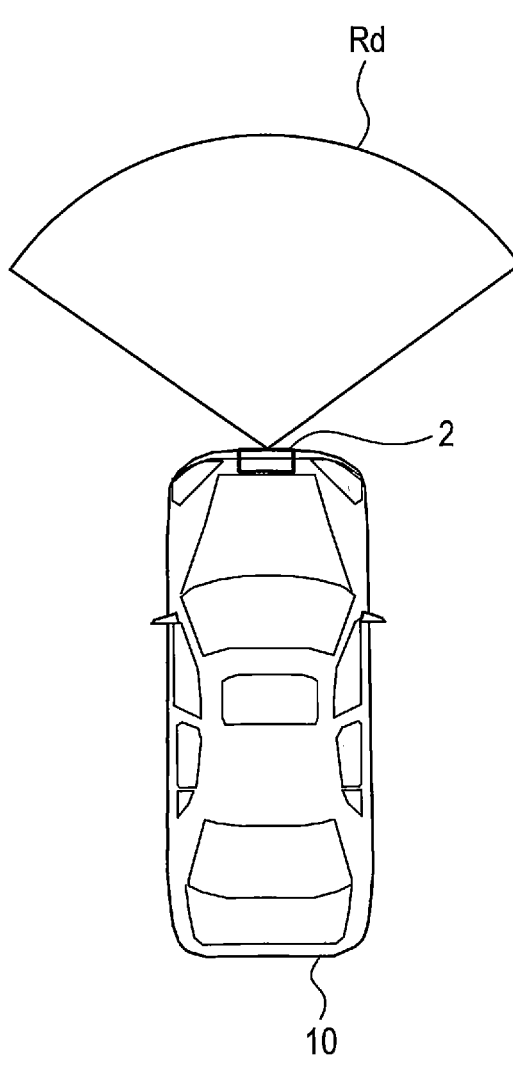
FIG. 2 is a diagram illustrating an example of a detection area when a radar apparatus is mounted to front of a vehicle.
Figure 3:
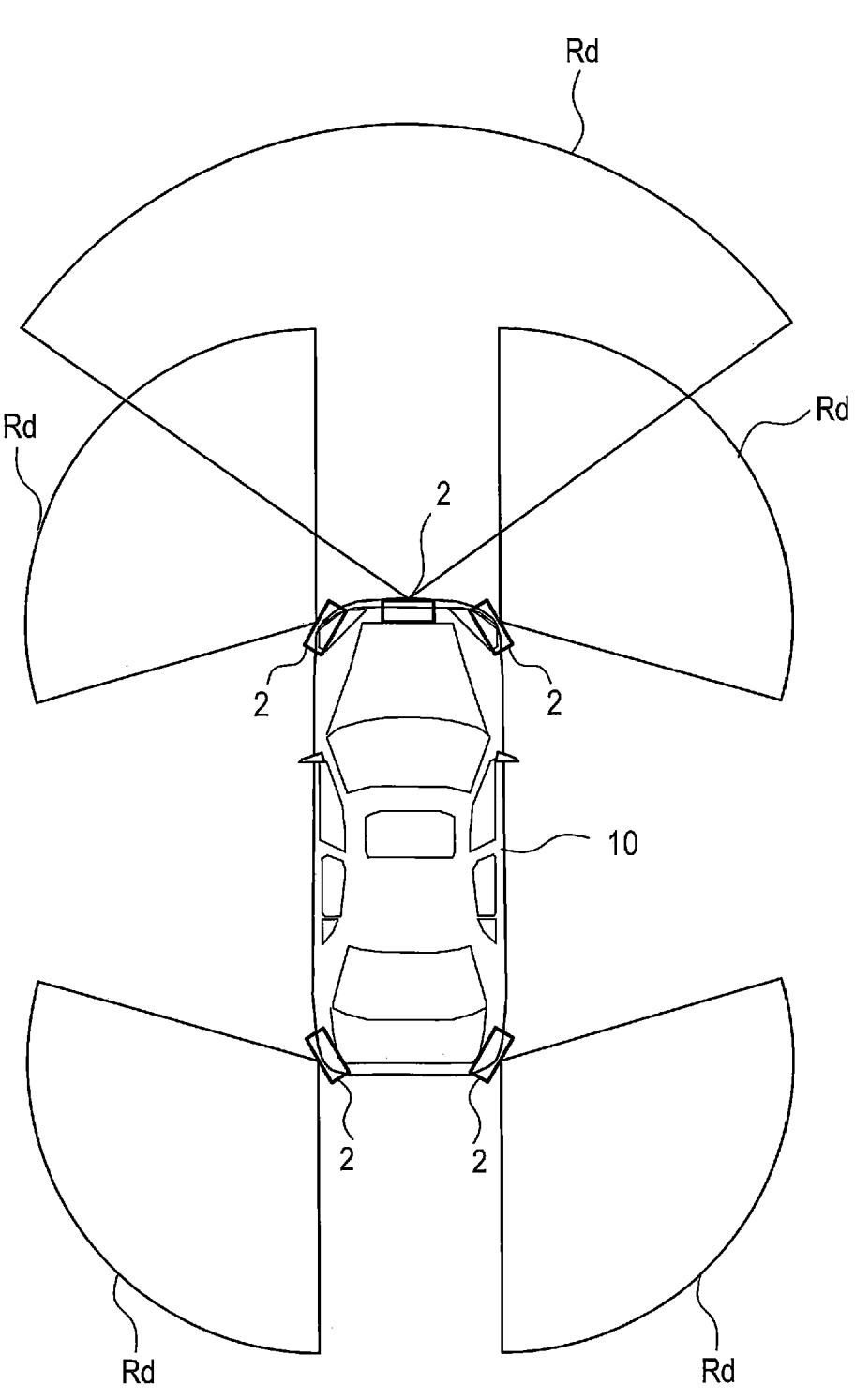
FIG. 3 is a diagram illustrating an example of detection areas when the radar apparatus is also mounted to sections other than the front of the vehicle.

As shown in FIG. 2, the radar apparatus 2 is mounted in a front center (such as a center of a front bumper) of the vehicle 10. An area in the front center of the vehicle 10 may be a detection area Rd. In addition, as shown in FIG. 3, the radar apparatus 2 is mounted in five sections that are the front center, a front left side, a front right side, a rear left side, and a rear right side of the vehicle 10. The area in the front center, an area on the front left, an area on the front right, an area on the rear left, and an area on the rear right may be the detection areas Rd. The radar apparatus 2 that is mounted in the vehicle 10 may be one or more radar apparatuses, in which the number thereof and mounting positions thereof may be selected as appropriate.

The radar apparatus 2 is a millimeter-wave radar. The radar apparatus 2 includes a transmission array antenna and a reception array antenna. More specifically, as an example, the radar apparatus 2 is configured as an FCM-system millimeter-wave radar. Here, FCM is an abbreviation of Fast Chirp Modulation.

The radar apparatus 2 irradiates a transmission wave that is a chirp signal to the detection area Rd at each processing cycle that arrives at a cycle Tcy prescribed in advance. In each processing cycle, the chirp signal is transmitted N times at a cycle T that is prescribed in advance. In addition, the radar apparatus 2 receives a reflection wave that is generated by the chirp signal being reflected at a reflection point of an object.

Furthermore, the radar apparatus 2 generates a beat signal in which the transmitted chirp signal and a reflection signal based on the reflected wave of the chirp signal are mixed. The radar apparatus 2 outputs a measurement signal that is generated by sampling the beat signal to the signal processing apparatus 1.

As shown in FIG. 1, the signal processing apparatus 1 is mainly configured by a known microcomputer that has a central processing unit (CPU) 11, a read-only memory (ROM) 12, a random access memory 13, a flash memory 14, and the like. The CPU 11 runs a program that is stored in the ROM 12 that is a non-transitory, tangible recording medium. As a result of the program being run, a method that corresponds to the program is performed.

The signal processing apparatus 1 may also include a co-processor that performs a fast Fourier transform (hereafter, FFT) process and the like.

1-2. Overview of Processes

The signal processing apparatus 1 performs a process for measuring an object that is present in the detection area Rd based on the N number of beat signals (hereafter, measurement signals) that are generated in each processing cycle.

Figure 4:
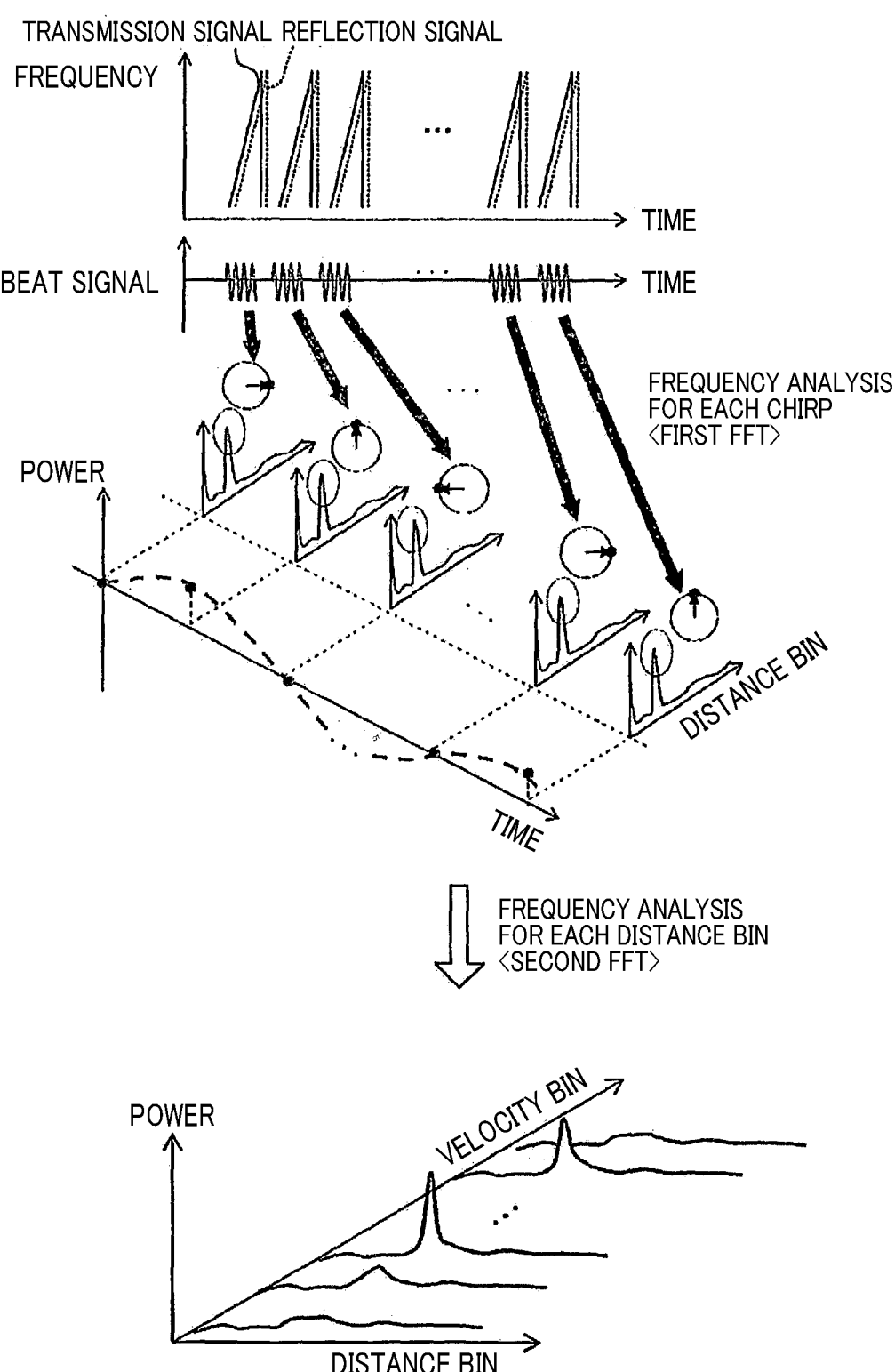
FIG. 4 is an explanatory diagram illustrating an overview of a two-dimensional FFT process.

That is, as shown in FIG. 4, the CPU 11 performs the FFT process on each of the N number of measurement signals that are generated in each processing cycle, and generates an N number of distance spectrums. The distance spectrum is a spectrum that indicates power in relation to distance. The distance spectrum has a frequency component that is based on a distance between the moving body and the object (in other words, the reflection point). Therefore, a frequency bin of the generated distance spectrum corresponds to a distance bin.

Furthermore, the CPU 11 performs the FFT process on each distance bin of the N number of distance spectrums that are generated, and generates a distance speed spectrum. The distance speed spectrum is a two-dimensional spectrum that indicates power in relation to the distance and a relative speed of the object to the moving body. The CPU 11 uses the distance speed spectrum as an intensity distribution and extracts a peak from the intensity distribution. The peak in the intensity distribution indicates an object. The relative speed and the distance of the object are measured based on the speed bin and the distance bin that correspond to the extracted peak.

The CPU 11 extracts at least one target peak that is a peak that is greater than an intensity threshold from the intensity distribution, using an upper limit number that is set in advance as an upper limit, and stores the number of extracted peaks that is the number of the extracted at least one target peak in the RAM 13. The intensity threshold is set when at least one target peak is newly extracted. That is, the CPU 11 sets the intensity threshold so as to suppress the number of the at least one target peak in a new intensity distribution from exceeding the upper limit number, based on the number of extracted peaks in a previous intensity distribution.

1-3. Details of Processes

A peak extraction process performed by the CPU 11 of the signal processing apparatus 1 will be described with reference to a flowchart in FIG. 5. Here, the present process is repeatedly started at each processing cycle.

First, at S101, the CPU 11 acquires an N number of measurement signals that are outputted from the radar apparatus 2. Next, at S102, the CPU 11 generates the distance speed spectrum as the intensity distribution of the N number of measurement signals. Next, the CPU 11 extracts at least one target peak that is greater than the intensity threshold from the intensity distribution (hereafter, a current intensity distribution) that is newly generated in the current processing cycle. Hereafter, the number of the at least one target peak that is extracted from an intensity distribution that is generated in the preceding processing cycle is referred to as the preceding number of extracted peaks.

That is, at S103, the CPU 11 determines whether the preceding number of extracted peaks is equal to or greater than an upper threshold. Here, the upper threshold is a value that is less than the upper limit number. Then, when an affirmative determination is made (Yes at S103), the CPU 11 proceeds to S106. When a negative determination is made (No at S103), the CPU 11 proceeds to S104.

At S104, the CPU 11 determines whether the preceding number of extracted peaks is equal to or less than a lower threshold. Here, the lower threshold is a value that is less than the upper threshold. Then, when an affirmative determination is made (Yes at S104), the CPU 11 proceeds to S105. When a negative determination is made (No at S104), the CPU 11 proceeds to S107.

At S105, the CPU 11 sets a first threshold as the intensity threshold. According to the present embodiment, the first threshold is calculated using the CFAR process. Here, as the first threshold, a predetermined threshold that is set in advance may be used.

At S106, the CPU 11 sets a second threshold as the intensity threshold. According to the present embodiment, the second threshold is a value in which a predetermined addition value is added to the first threshold that is calculated using the CFAR process in a manner similar to that at S105. That is, the second threshold is greater than the first threshold.

At S107 the CPU 11 sets the intensity threshold by a method that is same as that in the preceding processing cycle. According to the present embodiment, when the first threshold is set as the intensity threshold in the preceding processing cycle, the first threshold is calculated and set as the intensity threshold in the current processing cycle as well.

Meanwhile, when the second threshold is set as the intensity threshold in the preceding processing cycle, the second threshold is calculated and set as the intensity threshold in the current processing cycle as well.

Next, at S108, the CPU 11 extracts at least one target peak from the intensity distribution. According to the present embodiment, the CPU 11 determines whether the intensity threshold is exceeded in order from a peak in a speed bin that corresponds to a smaller relative speed, and extracts a peak that exceeds the intensity threshold as the at least one target peak. Furthermore, when a plurality of peaks of which the speed bin is the same is present, the CPU 11 determines, regarding the plurality of peaks, whether the intensity threshold is exceeded in order from a peak in a distance bin that corresponds to a shorter distance and extracts a peak that exceeds the intensity threshold as the at least one target peak.

Here, the CPU 11 may determine whether the intensity threshold is exceeded in order from a peak in a distance bin that corresponds to a shorter distance in the distance speed spectrum and extract a peak that exceeds the intensity threshold as the at least one target peak. Furthermore, when a plurality of peaks of which the distance bin is the same is present, the CPU 11 may determine, regarding the plurality of peaks, whether the intensity threshold is exceeded in order from a peak in a speed bin that corresponds to a smaller relative speed and extract a peak that exceeds the intensity threshold as the at least one target peak.

Next, at S109, the CPU 11 stores the number of extracted peaks that is the number of the at least one target peak extracted at S108. Here, the distance to the object and the relative speed in relation to the object are determined based on the at least one target peak that is extracted.

1-3. Variation Examples

The distance speed spectrum that is the intensity distribution may have both or either of a plurality of distance ranges and a plurality of relative speed ranges. Here, the plurality of distance ranges are formed by the distance bin in the distance speed spectrum being divided into a plurality of ranges. That is, the distance bin that corresponds to a peak is included in any one of the distance ranges. In addition, the plurality of relative speed ranges are formed by the speed bin in the distance speed spectrum being divided into a plurality of ranges. That is, the speed bin that corresponds to a peak is included in any one of the relative speed ranges.

In addition, the intensity threshold that corresponds to each distance range and/or each relative speed range may be provided, and the intensity thresholds may be uniquely set. That is, for example, a unique intensity threshold may be provided in correspondence to each distance range. A unique intensity threshold may be provided in correspondence to each relative speed range. In addition, for example, an area that on the distance speed spectrum that is identified by a combination of the distance range and the relative speed range may be a combined range. A unique intensity threshold may be provided in correspondence to the combined range.

That is, at S103 and S104 of the peak extraction process, the CPU 11 compares the preceding number of extracted peaks for each distance range, each relative speed range, or each combined range, and the upper threshold and the lower threshold for each distance range, each relative speed range, or each combined range. In addition, at S105 to S107 of the peak extraction process, the CPU 11 calculates the first threshold or the second threshold that corresponds to each distance range, each relative speed range, or each combined range by the CFAR process. Then, the CPU 11 sets the first threshold or the second threshold as the intensity threshold that corresponds to the sane distance range, relative speed range, or combined range as the first threshold or the second threshold.

Then, at S108, when a unique intensity threshold is provided in correspondence to each distance range, the CPU 11 extracts a peak, among the peaks that correspond to the distance range, of which the intensity exceeds the intensity threshold set for the distance range as the at least one target peak, using the upper limit number that is set in advance for each distance range as the upper limit.

Here, the peak that corresponds to the distance range refers to a peak of which the corresponding distance bin is included in the distance range. In addition, when a unique intensity threshold is provided in correspondence to each relative speed range, the CPU 11 extracts a peak, among the peaks that correspond to the relative speed range, of which the intensity exceeds the intensity threshold set for the relative speed range as the at least one target peak, using the upper limit number that is set in advance for each relative speed range as the upper limit.

Here, the peak that corresponds to the relative speed range refers to a peak of which the corresponding speed bin is included in the relative speed range. Furthermore, when a unique intensity threshold is provided in correspondence to each relative speed range, the CPU 11 extracts a peak, among the peaks that correspond to the combined range, of which the intensity exceeds the intensity threshold set for the combined range as the at least one target peak, using the upper limit number that is set in advance for each combined range as the upper limit. Here, the peak that corresponds to the combined range refers to a peak of which the corresponding distance bin and speed bin are included in the combined range.

1-4. Effects

According to the first embodiment described in detail above, following effects can be achieved.

(1a) The signal processing apparatus 1 sets the intensity threshold based on the number of extracted peaks in the previous intensity distribution such that the number of the at least one target peak exceeding the upper limit number is suppressed.

Here, when the signal processing apparatus 1 extracts the at least one target peak, the signal processing apparatus 1 searches the intensity distribution for the at least one target peak until the upper limit number is exceeded. However, when the upper limit number is exceeded, the search is no longer performed. That is, when the number of the at least one target peak exceeds the upper limit number, an area that is not searched occurs in the intensity distribution. A peak that indicates an important object such as a leading vehicle may be included in this area.

Therefore, when the intensity threshold is set such that the number of the at least one target peak exceeding the upper limit number is suppressed, the number of the at least one target peak can be reduced, and a wider area is searched in the intensity distribution. As a result, the at least one target peak that is not extracted when the number of the at least one target peak exceeds the upper limit number can be extracted. Consequently, as a result of the above-described configuration, non-extraction of a peak that indicates an important object can be suppressed, compared to a case in which the intensity threshold is not set such that the number of the at least one target peak exceeding the upper limit number is suppressed.

(1b) The signal processing apparatus 1 sets the intensity threshold to be higher when the preceding number of extracted peaks is equal to or greater than the upper threshold, compared to when the preceding number of extracted peaks is less than the upper threshold.

Here, for example, in an environment in which numerous stationary objects are present in the vicinity of the moving body, the number of peaks may tend to be numerous. In this manner, the number of peaks tends to be dependent on the environment surrounding the moving body. In addition, the environment surrounding the moving body gradually changes and the number of the peaks does not instantaneously significantly change. That is, the preceding number of extracted peaks being equal to or greater than the upper threshold means that the number of extracted peaks may have already been approaching the upper limit number in the preceding processing cycle.

Therefore, in the current processing cycle, the number of extracted peaks is preferably prevented from approaching the upper limit number. Therefore, the signal processing apparatus 1 sets the intensity threshold to be higher so as to reduce the number of the at least one target peak in the current processing cycle. Consequently, the number of the at least one target peak can be suppressed from exceeding the upper limit number, and thus non-extraction of a peak that indicates an important object can be suppressed.

(1c) The signal processing apparatus 1 successively extracts the target peaks from the intensity distribution in order from the target peak that corresponds to a shorter distance. As a result of a configuration such as this, the signal processing apparatus 1 can preferentially extract the target peak that is highly likely to approach the moving body.

(1d) The signal processing apparatus 1 extracts the target peaks from the intensity distribution in order from the target peak that corresponds to a smaller relative speed. As a result of a configuration such as this, the signal processing apparatus 1 can preferentially extract the target peak that is highly likely to approach the moving body.

(1e) For example, in the intensity distribution, the intensity may change based on the distance bin and/or the relative speed bin, such as the intensity more easily increasing regarding the peak in the distance bin that corresponds to a shorter distance. Therefore, when the intensity threshold is uniformly prescribed over an overall range, at least one target peak may be extracted so as to be biased to a distance bin and/or a relative speed bin of a certain range.

In contrast, in a variation example according to the first embodiment, the intensity threshold is provided in correspondence to each distance range and/or relative speed range. A value of the intensity threshold is uniquely set. As a result, the at least one target peak being concentrated in a certain distance range or relative speed range can be suppressed.

Consequently, at least one target peak can be favorably extracted from an overall area of the intensity distribution.

Here, according to the first embodiment, S103 to S107 correspond to a process performed by a setting unit. S108 corresponds to a process performed by an extracting unit. S109 corresponds to a process performed by a storage processing unit. The upper threshold corresponds to a peak number threshold.

2. Second Embodiment

2-1. Differences from the First Embodiment

A basic configuration according to the second embodiment is similar to that according to the first embodiment. Therefore, descriptions of shared configurations are omitted. Differences will mainly be described.

According to the first embodiment described above, in the peak extraction process, the CPU 11 sets the intensity threshold based on the preceding number of extracted peaks. Meanwhile, according to the second embodiment, in the peak extraction process, the CPU 11 sets the intensity threshold based on a predicted umber that is a value predicting the extraction peak number in the current intensity distribution.

2-2. Processes

Figure 6:
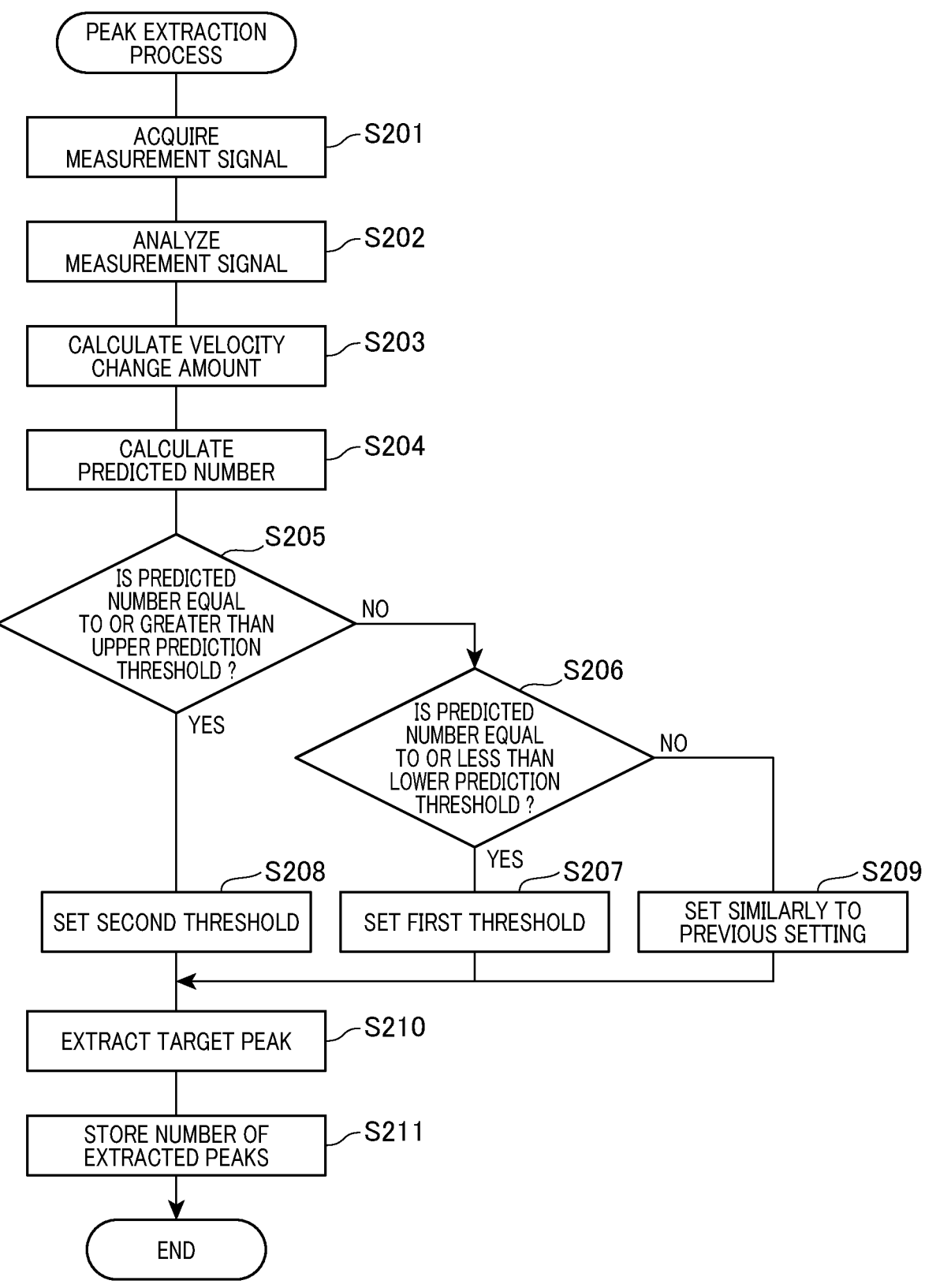
FIG. 6 is a flowchart illustrating a peak extraction process according to a second embodiment.

A peak extraction process performed by the signal processing apparatus 1 according to the second embodiment instead of the peak extraction process according to the first embodiment will be described with reference to a flowchart in FIG. 6.

Figure 5:
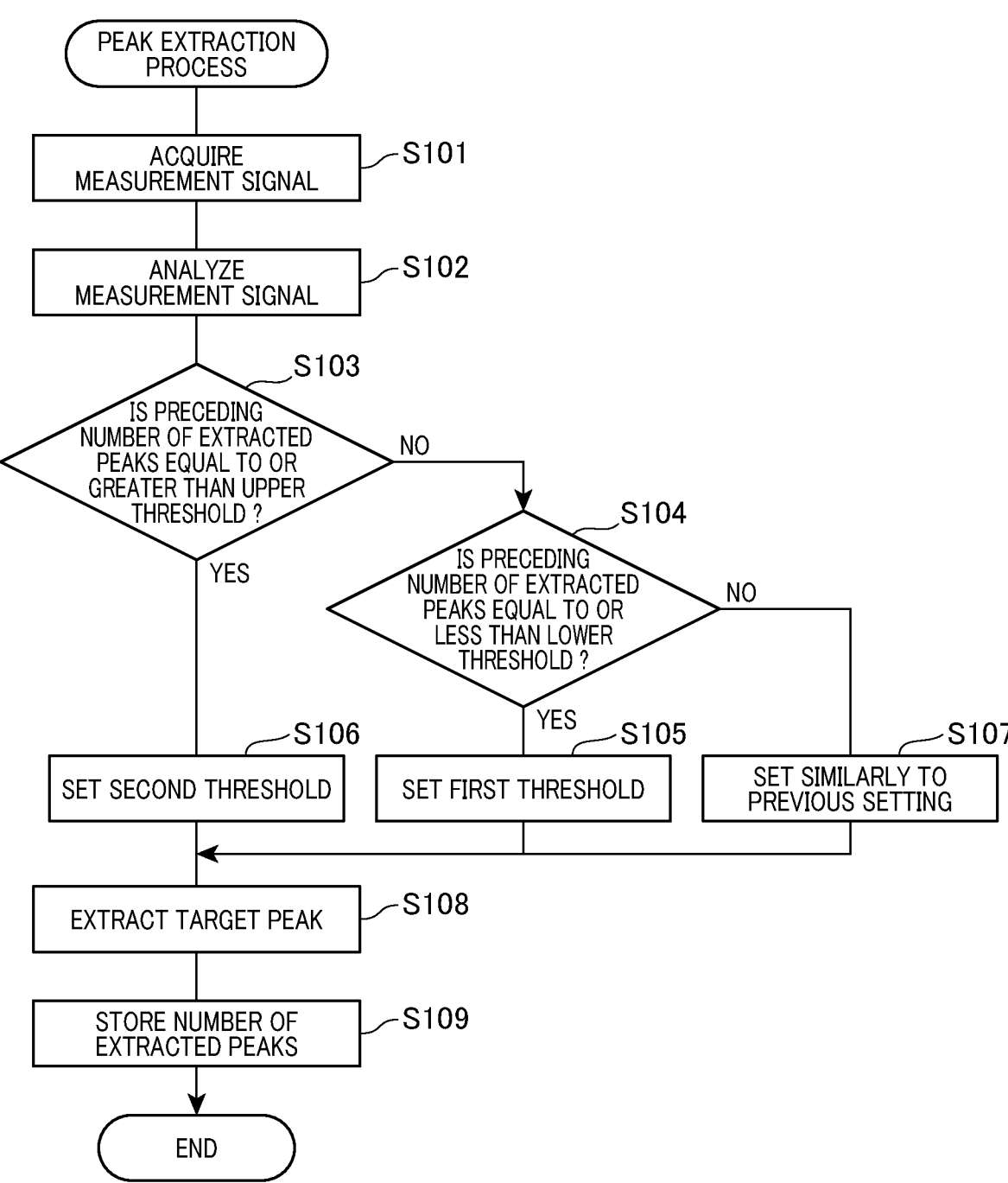
FIG. 5 is a flowchart illustrating a peak extraction process according to a first embodiment.

S201 and S202 are processes that are similar to those at S101 and S102 in FIG. 5. Next, at S203, the CPU 11 calculates a speed change amount of the moving body within a predetermined amount of time. Here, the CPU 11 may calculate the speed change amount of the vehicle 10 based on a speed of the vehicle 10 that is acquired by a speed sensor (not shown).

Next, at S204, the CPU 11 calculates a predicted number (predicted count).

According to the present embodiment, the CPU 11 calculates the predicted number based on the number of extracted peaks within a fixed period that includes the preceding processing cycle, that is, the number of extracted peaks in a plurality of past processing cycles that include the preceding processing cycle, among the number of extracted peaks stored in the storage unit.

That is, for example, in a case in which the number of extracted peaks has an increasing trend in the plurality of past processing cycles, the number of extracted peaks in the current processing cycle can be thought to increase from the number of extracted peaks in the preceding processing cycle. Therefore, the CPU 11 calculates the predicted number based on a proportion of increase/decrease in the number of extracted peaks in the plurality of past processing cycles.

At this time, the CPU 11 calculates the predicted number by also taking into consideration the speed change amount of the moving body calculated at S203. That is, for example, even when the environment surrounding the moving body is the same, the peaks may tend to increase as the speed of the moving body increases. Therefore, the CPU 11 calculates a greater predicted number as the speed change amount of the moving body increases. Here, the CPU 11 may calculate the predicted number without taking into consideration the speed change amount. In this case, the CPU 11 may not perform the process at S203.

Next, at S205, the CPU 11 determines whether the predicted number is equal to or greater than an upper prediction threshold. Here, as the upper prediction threshold, a value that is less than the upper limit number is set. Then, when an affirmative determination is made (Yes at S205), the CPU 11 proceeds to S208. When a negative determination is made (No at S205), the CPU 11 proceeds to S206.

At S206, the CPU 11 determines whether the predicted number is equal to or less than a lower prediction threshold. Here, a value that is less than the upper prediction threshold is set as the lower prediction threshold. Then, when an affirmative determination is made (Yes at S206), the CPU 11 proceeds to S207. When a negative determination is made (No at S206), the CPU 11 proceeds to S209.

At S207, the CPU 11 sets the first threshold as the intensity threshold in manner similar to that at S105 in FIG. 5. At S208, the CPU 11 sets the second threshold as the intensity threshold in a manner similar to that at S106 in FIG. 5. At S209, the CPU 11 sets the intensity threshold by a method that is the same as that in the preceding processing cycle, in a manner similar to that at S107 in FIG. 5.

Next, at S210, the CPU 11 extracts the at least one target peak from the intensity distribution in a manner similar to that at S108 in FIG. 5. Next, at S211, the CPU 11 stores the number of extracted peaks that is the nmber of the at least one target peak extracted at S210 in manner similar to that at S109 in FIG. 5.

2-3. Variation Examples

In a manner similar to that according to the first embodiment, the distance speed spectrum that is the intensity distribution may have both or either of a plurality of distance ranges and a plurality of relative speed ranges. In addition, an intensity threshold that corresponds to each distance range and/or relative speed range may be provided. The intensity thresholds may be uniquely set.

That is, at S205 and S206 in the peak extraction process, the CPU 11 compares the predicted number for each distance range, each relative speed range, or each combined range, and the upper prediction threshold and the lower prediction threshold for each distance range, each relative speed range, or each combined range.

In addition, at S207 to S209 of the peak extraction process, the CPU 11 calculates the first threshold or the second threshold that corresponds to each distance range, each relative speed range, or each combined range by the CFAR process. Then, the CPU 11 sets the first threshold or the second threshold as the intensity threshold that corresponds to the sane distance range, relative speed range, or combined range as the first threshold or the second threshold.

Then, at S210, when a unique intensity threshold is provided in correspondence to each distance range, the CPU 11 extracts a peak, among the peaks that correspond to the distance range, of which the intensity exceeds the intensity threshold set for the distance range as the at least one target peak, using the upper limit number that is set in advance for each distance range as the upper limit.

In addition, when a unique intensity threshold is provided in correspondence to each relative speed range, the CPU 11 extracts a peak, among the peaks that correspond to the relative speed range, of which the intensity exceeds the intensity threshold set for the relative speed range as the at least one target peak, using the upper limit number that is set in advance for each relative speed range as the upper limit.

Furthermore, when a unique intensity threshold is provided in correspondence to each relative speed range, the CPU 11 extracts a peak, among the peaks that correspond to the combined range, of which the intensity exceeds the intensity threshold set for the combined range as the at least one target peak, using the upper limit number that is set in advance for each combined range as the upper limit.

2-4. Effects

According to the second embodiment described in detail above, the following effects can be achieved in addition to the effects according to the first embodiment described above.

(2a) The signal processing apparatus 1 sets the intensity threshold to be higher when the predicted number is equal to or greater than the upper prediction threshold, compared to when the predicted number is less than the upper prediction threshold.

Here, in light of the number of peaks not instantaneously significantly changing, the number of the at least one target peak in the current processing cycle can be predicted from the trend in increase/decrease of the number of extracted peaks in the past plurality of processing cycles.

In addition, the predicted number being equal to or greater than the upper prediction threshold indicates that the predicted number may be approaching the upper limit number.

Therefore, in the present processing cycle, adjustment is preferably made such that the number of the at least one target peak does not approach the upper limit number. Therefore, the signal processing apparatus 1 sets the intensity threshold to be higher so as to reduce the number of the at least one target peak in the current processing cycle. As a result, the number of the at least one target peak exceeding the upper limit number can be suppressed. Consequently, non-extraction of a peak that indicates an important object can be suppressed.

(2b) The signal processing apparatus 1 calculates the predicted number based on the speed change amount of the moving body. As a result of a configuration such as this, compared to a configuration in which the predicted number is calculated without the speed change amount of the moving body being taken into consideration, the signal processing apparatus 1 can more accurately predict the number of the at least one target peak in the current processing cycle.

Here, according to the second embodiment, S203 and S204 correspond to a process performed by a predicting unit. S205 to S209 correspond to a process performed by the setting unit. S210 corresponds to a process performed by the extracting unit. S211 corresponds to a process performed by the storage processing unit. The upper prediction threshold corresponds to a peak prediction threshold.

3. Other Embodiments

Embodiments of the present disclosure are described above. However, the present disclosure is not limited to the above-described embodiment. It goes without saying that various embodiments are possible.

(3a) According to the above-described embodiments, a distance speed spectrum is used as the intensity distribution. However, a type of the intensity distribution is not limited thereto. The distance spectrum may be used as the intensity distribution.

That is, the CPU 11 may generate the distance spectrum of the measurement signal as a current intensity distribution at S102 of the peak extraction process according to the first embodiment, and extract the at least one target peak that exceeds the intensity threshold from the current intensity distribution at S103 to S108.

Figure 7:
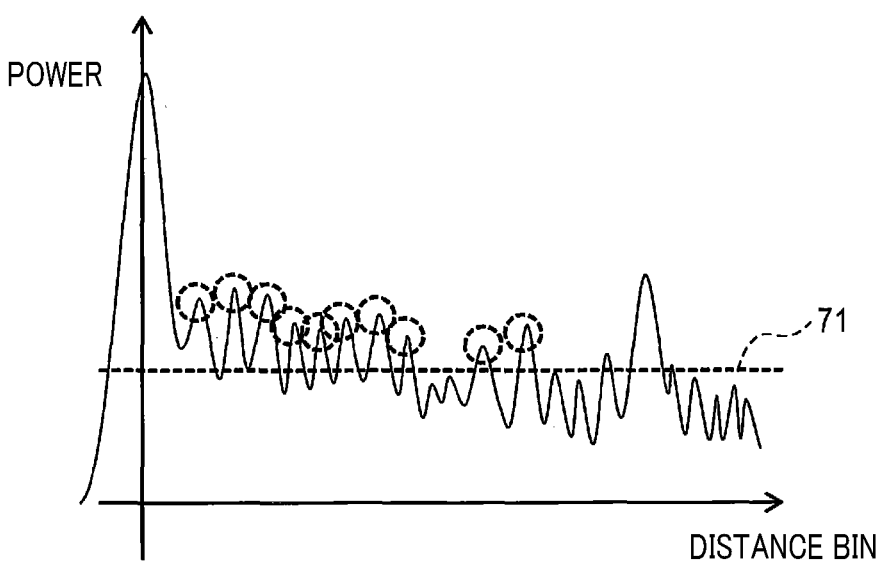
FIG. 7 is an explanatory diagram illustrating an example of when a first threshold is set in a distance spectrum.
Figure 8:
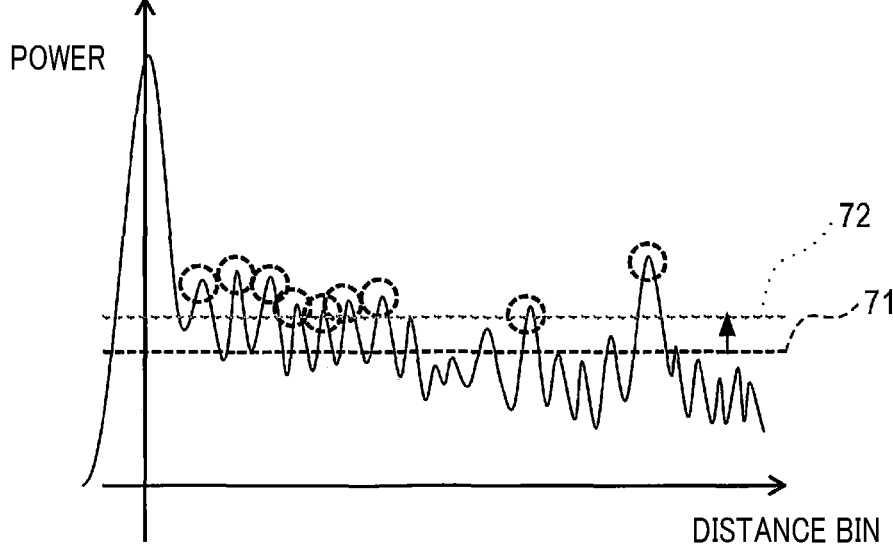
FIG. 8 is an explanatory diagram illustrating an example when a second threshold is set in the distance spectrum.

For example, at S105, the CPU 11 may set a first threshold 71 as the intensity threshold as shown in FIG. 7. In addition, for example, at S106, the CPU 11 may set a second threshold 72 that is higher than the first threshold 71 as the intensity threshold as shown in FIG. 8. In addition, at S108, the CPU 11 may determine whether the intensity threshold is exceeded in order from the peak in the distance bin that corresponds to the shorter distance, and extract the peak that exceeds the intensity threshold as the at least one target peak. Then, the distance to the object may be determined based on the at least one target peak that is extracted.

Furthermore, in the peak extraction process according to the second embodiment as well, the CPU 11 may similarly generate the distance spectrum of the measurement signal as the current intensity distribution at S202, and extract the at least one target peak that exceeds the intensity threshold from the current intensity distribution at S203 to S210. In addition, at S210, the CPU 11 may determine whether the intensity threshold is exceeded in order from the peak in the distance bin that corresponds to the shorter distance, and extract the peak that exceeds the intensity threshold as the at least one target peak. Then, the distance to the object may be determined based on the at least one target peak that is extracted.

(3b) According to the first embodiment, the upper threshold and the lower threshold are used as at S103 and S104. However, for example, S104 and S107 may be omitted, and the intensity threshold may be set based on the upper threshold. That is, when the number of extracted peaks is less than the upper threshold, the first threshold may be set as the intensity threshold.

In addition, according to the second embodiment as well, S206 and S209 may be omitted. When the predicted number is less than the upper prediction threshold, the first threshold may be set as the intensity threshold.

(3c) According to the above-described embodiments, the FCM-system millimeter wave radar is used as the radar apparatus 2. However, the type of the radar apparatus 2 is not limited thereto. For example, a frequency-modulation continuous wave (FMCW)-system or a multi-frequency CW-system millimeter-wave radar may be used.

(3d) A function provided by a single constituent element according to the above-described embodiments may be dispersed as a plurality of constituent elements. Functions provided by a plurality of constituent elements may be integrated into a single constituent element. In addition, a part of a configuration according to the above-described embodiments may be omitted. Furthermore, at least a part of a configuration according to the above-described embodiments may be added to or replace a configuration of another of the above-described embodiments.

What is claimed is:

1. A signal processing apparatus that is mounted in a moving body and performs a process for measuring an object that is present in a vicinity of the moving body using at least one measurement signal based on a reflected wave of a transmission wave that is irradiated, the signal processing apparatus comprising:

a processor;

a non-transitory computer-readable storage medium; and a set of computer-executable instructions stored on the non-transitory computer-readable storage medium that cause the processor to:

set intensity thresholds, wherein each intensity threshold corresponds to an intensity distribution based on the at least one measurement signal that is periodically generated, wherein the intensity distribution is an intensity distribution that is based on (i) a distance between the object and the moving body and (ii) a relative speed between the object and the moving body;

extract at least one target peak from each intensity distribution until a number of the at least one target peak from each intensity distribution exceeds a predetermined upper limit, wherein the at least one target peak comprises a peak in each intensity distribution that is greater than a corresponding intensity threshold;

store, in a storage, the at least one target peak that is extracted from each intensity distribution; and calculate a value predicting a number of the at least one target peak from a current intensity distribution, wherein the value is based on (i) a number of the at least one target peak from a previous intensity distribution, among the at least one target peak that is extracted and stored and (ii) a speed change amount of the moving body, wherein each intensity threshold is set so as to suppress the number of the at least one target peak from the current intensity distribution from exceeding the predetermined upper limit, based on the number of the at least one target peak from the previous intensity distribution, wherein a current intensity threshold that corresponds to the current intensity distribution is set to be higher when the value is equal to or higher than a predetermined peak prediction threshold, compared to when the value is less than the predetermined peak prediction threshold.

2. The signal processing apparatus according to claim 1, wherein the set of computer-executable instructions further cause the processor to extract the at least one target peak from each intensity distribution in order from the at least one target peak that corresponds to a smaller relative speed.

3. The signal processing apparatus according to claim 1, wherein each intensity distribution has a plurality of relative speed ranges, and the relative speed corresponding to each peak is included in any of the relative speed ranges, wherein the set of computer-executable instructions further cause the processor to:

set an intensity threshold in correspondence to each relative speed range in the corresponding intensity distribution; and extract at least one target peak for each relative speed range until a number of the at least one target peak for each relative speed range exceeds a predetermined upper limit for each relative speed range, the at least one target peak for each relative speed range comprising a peak that is greater than the intensity threshold that corresponds to the relative speed range, wherein each intensity threshold is set such that the number of the at least one target peak for each relative speed range that is extracted exceeding the predetermined upper limit for each relative speed range is suppressed.

4. A signal processing apparatus that is mounted in a moving body and performs a process for measuring an object that is present in a vicinity of the moving body using at least one measurement signal based on a reflected wave of a transmission wave that is irradiated, the signal processing apparatus comprising:

a processor;

a non-transitory computer-readable storage medium; and a set of computer-executable instructions stored on the non-transitory computer-readable storage medium that cause the processor to:

set an intensity threshold that corresponds to an intensity distribution based on the at least one measurement signal that is periodically generated, wherein the intensity distribution is an intensity distribution that is based on (i) a distance between the object and the moving body and (ii) a relative speed between the object and the moving body;

extract at least one target peak that is a peak that is greater than the intensity threshold in the intensity distribution, wherein the at least one target peak is extracted from the intensity distribution in order from the at least one target peak that corresponds to a smaller relative speed and using an upper limit number that is set in advance as an upper limit; and store, in a storage, a number of extracted peaks that is a number of the at least one target peak that is extracted, wherein the intensity threshold is set so as to suppress the number of the at least one target peak in a new intensity distribution from exceeding the upper limit number, based on the number of extracted peaks in a previous intensity distribution and stored.

5. The signal processing apparatus according to claim 4, wherein the set of computer-executable instructions further cause the processor to (i) set a current intensity threshold that corresponds to a current intensity distribution based on a number of extracted peaks in a preceding intensity distribution that is generated immediately before the current intensity distribution, among the number of extracted peaks that is stored, and (ii) set the intensity threshold to be higher when the number of extracted peaks in the preceding intensity distribution is equal to or greater than a predetermined peak number threshold, compared to when the number of extracted peaks in the preceding intensity distribution is less than the predetermined peak number threshold.

6. The signal processing apparatus according to claim 4, wherein the set of computer-executable instructions further cause the processor to:

calculate a value predicting a number of extracted peaks in a current intensity distribution, calculate the value based on a number of extracted peaks in the intensity distribution generated in a previous intensity distribution, among the number of extracted peaks that is stored; and set a current intensity threshold that corresponds to the current intensity distribution to be higher when the value is equal to or higher than a predetermined peak prediction threshold, compared to when the value is less than the predetermined peak prediction threshold.

7. A signal processing apparatus that is mounted in a moving body and performs a process for measuring an object that is present in a vicinity of the moving body using at least one measurement signal based on a reflected wave of a transmission wave that is irradiated, the signal processing apparatus comprising:

a processor;

a non-transitory computer-readable storage medium; and a set of computer-executable instructions stored on the non-transitory computer-readable storage medium that cause the processor to:

set an intensity threshold that corresponds to an intensity distribution based on the at least one measurement signal that is periodically generated, wherein the intensity distribution is an intensity distribution that is based on a distance between the object and the moving body;

extract at least one target peak that is a peak that is greater than the intensity threshold in the intensity distribution, using an upper limit number that is set in advance as an upper limit; and store, in a storage a number of extracted peaks that is a number of the at least one target peak that is extracted, wherein the intensity threshold is set so as to suppress the number of the at least one target peak in a new intensity distribution from exceeding the upper limit number, based on the number of extracted peaks in a previous intensity distribution and stored, wherein the intensity threshold is set in correspondence to each distance range in the intensity distribution, wherein the set of computer-executable instructions further cause the processor to extract, as at least one target peak for each distance range, a peak that is greater than the intensity threshold that corresponds to the distance range, among peaks included in the distance range, using an upper limit number set in advance for each distance range as the upper limit, wherein the intensity threshold is set such that a number of the at least one target peak for each distance range that is extracted and exceeding the upper limit number is suppressed.

8. The signal processing apparatus according to claim 7, wherein the set of computer-executable instructions further cause the processor to extract the at least one target peak from the intensity distribution in order from the at least one target peak that corresponds to a shorter distance.

9. The signal processing apparatus according to claim 7, wherein the set of computer-executable instructions further cause the processor to:

calculate a value predicting a number of extracted peaks in a current intensity distribution;

calculate the value based on a number of extracted peaks in a previous intensity distribution, among the number of extracted peaks that is stored; and set a current intensity threshold that corresponds to the current intensity distribution to be higher when the value is equal to or higher than a predetermined peak prediction threshold, compared to when the value is less than the peak prediction threshold.

10. A signal processing apparatus that is mounted in a moving body and performs a process for measuring an object that is present in a vicinity of the moving body using at least one measurement signal based on a reflected wave of a transmission wave that is irradiated, the signal processing apparatus comprising:

15 a processor;

a non-transitory computer-readable storage medium; and a set of computer-executable instructions stored on the non-transitory computer-readable storage medium that cause the processor to:

set an intensity threshold that corresponds to an intensity distribution based on the at least one measurement signal that is periodically generated, wherein the intensity distribution is an intensity distribution that is based on (i) a distance between the object and the moving body and (ii) a relative speed between the object and the moving body;

extract at least one target peak that is a peak that is greater than the intensity threshold in the intensity distribution, using an upper limit number that is set in advance as an upper limit; and store, in a storage, a number of extracted peaks that is a number of the at least one target peak that is extracted, wherein the intensity threshold is set so as to suppress the number of the at least one target peak in a new intensity distribution from exceeding the upper limit number, based on the number of extracted peaks in a previous intensity distribution that is stored, wherein the intensity distribution has a plurality of relative speed ranges, and the relative speed corresponding to the peak is included in any of the relative speed ranges, wherein the intensity threshold is set in correspondence to each relative speed range in the intensity distribution, wherein the set of computer-executable instructions further cause the processor to extract, as at least one target peak for each relative speed range, a peak that is greater than the intensity threshold that corresponds to the relative speed range, among peaks included in the relative speed range, using an upper limit number set in advance for each relative speed range as the upper limit, wherein the intensity threshold is set such that a number of the at least one target peak for each relative speed range that is extracted and exceeding the upper limit number is suppressed.

11. The signal processing apparatus according to claim 10, wherein the set of computer-executable instructions further cause the processor to (i) set a current intensity threshold that corresponds to a current intensity distribution based on a number of extracted peaks in a preceding intensity distribution that is generated immediately before the current intensity distribution, among the number of extracted peaks that is stored, and (ii) set the intensity threshold to be higher when the number of extracted peaks in the preceding intensity distribution is equal to or greater than a predetermined peak number threshold, compared to when the number of extracted peaks in the preceding intensity distribution is less than the predetermined peak number threshold.

12. A signal processing apparatus that is mounted in a moving body and performs a process for measuring an object that is present in a vicinity of the moving body using at least one measurement signal based on a reflected wave of a transmission wave that is irradiated, the signal processing apparatus comprising:

16 a processor;

a non-transitory computer-readable storage medium; and a set of computer-executable instructions stored on the non-transitory computer-readable storage medium that cause the processor to:

set intensity thresholds, wherein each intensity threshold corresponds to an intensity distribution based on the at least one measurement signal that is periodically generated;

extract at least one target peak from each intensity distribution until a number of the at least one target peak from each intensity distribution exceeds a predetermined upper limit, wherein the at least one target peak comprises a peak in each intensity distribution that is greater than a corresponding intensity threshold;

store, in a storage, the at least one target peak that is extracted from each intensity distribution;

set each intensity threshold so as to suppress the number of the at least one target peak from a current intensity distribution from exceeding the predetermined upper limit, based on the number of the at least one target peak from a previous intensity distribution that is stored;

set a current intensity threshold that corresponds to the current intensity distribution based on a number of the at least one target peak from an immediately preceding intensity distribution, among the at least one target peak that is extracted and stored; and set the current intensity threshold to be higher when the number of the at least one target peak from the immediately preceding intensity distribution is equal to or greater than a predetermined peak number threshold, compared to when the number of the at least one target peak from the immediately preceding intensity distribution is less than the predetermined peak number threshold, wherein the predetermined peak number threshold is a value that is less than the predetermined upper limit.

13. A signal processing apparatus that is mounted in a moving body and performs a process for measuring an object that is present in a vicinity of the moving body using at least one measurement signal based on a reflected wave of a transmission wave that is irradiated, the signal processing apparatus comprising:

a processor;

a non-transitory computer-readable storage medium; and a set of computer-executable instructions stored on the non-transitory computer-readable storage medium that cause the processor to:

set intensity thresholds, wherein each intensity threshold corresponds to an intensity distribution based on the at least one measurement signal that is periodically generated;

extract at least one target peak from each intensity distribution until a number of the at least one target peak from each intensity distribution exceeds a predetermined upper limit, wherein the at least one target peak comprises a peak in each intensity distribution that is greater than a corresponding intensity threshold;

store, in a storage, the at least one target peak that is extracted from each intensity distribution;

calculate a value predicting a number of the at least one target peak from a current intensity distribution, wherein the value is based on a number of the at least one target peak from a previous intensity distribution, among the at least one target peak that is extracted and stored; and set a current intensity threshold that corresponds to the current intensity distribution to be higher when the value is equal to or higher than a predetermined peak prediction threshold, compared to when the value is less than the predetermined peak prediction threshold, wherein the predetermined peak prediction threshold is a value that is less than the predetermined upper limit.

* * * * *